United States Patent Office 3,553,102
Patented Jan. 5, 1971

3,553,102
HYDROCRACKING CATALYST AND METHOD OF PREPARATION
Edward J. Rosinski, Deptford, and Charles J. Plank, Woodbury, N.J., assignors to Mobil Oil Corporation, a corporation of New York
No Drawing. Filed Nov. 8, 1968, Ser. No. 774,502
Int. Cl. C10g *13/02;* B01j *11/74*
U.S. Cl. 208—111                                 4 Claims

---

ABSTRACT OF THE DISCLOSURE

An improved hydrocracking catalyst composition prepared by subjecting a crystalline aluminosilicate starting material, characterized by a silica/alumina mol ratio of at least 3, to up to about 35% alumina removal by treatment with a chelating agent, followed by contacting the resultant partially dealuminized crystalline aluminosilicate with a nonaqueous sulfur-containing solution of a platinum or palladium group metal, with the result that the metal is present in the catalyst composition, after drying, in the sulfided form.

---

BACKGROUND OF THE INVENTION

(1) Field of the invention

The invention relates to an improved hydrocracking catalyst composition characterized by high activity and to a method for preparing the same.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are uniform in size. Since the dimensions of these pores are such as to accept, by adsorption, molecules of certain dimensions while rejecting those of larger dimensions, these materials have come to be known as "molecular sieves" and are utilized in a variety of ways to take advantage of these properties. For example, the concept of shape selective catalytic reactions; e.g., those in which catalytically active surfaces are located within the intra-crystalline volume of substances which act as molecular sieves, and in which the sieve dimensions are in such relation to the chemical species involved in the catalytic reaction that only selected species are allowed to pass the sieve structure, is thoroughly described in U.S. 3,140,322.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed by formula wherein the ratio of Al atom in the rigid three-dimensional network to the number of the various cations, such as Ca/2, Sr/2, Na, K, or Li, is equal to unity. One type of cation can be exchanged either in entirety or partially by another type of cation utilizing ion exchange technique in a conventional manner. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite Y (U.S. 3,130,007), zeolite K–G (U.S. 3,055,654), zeolite ZK–5 (U.S. 3,247,195), and zeolite ZK–4 (U.S. 3,314,-752) merely to name a few.

The catalytic properties of transition metal-loaded aluminosilicates, as is well known, has been demonstrated to be extremely important to petroleum, chemical and enzymic reactions. The aluminosilicates have been activated, i.e., metal loaded, for these reactions by methods employing impregnation, vapor deposition and base-exchange of the desired metal to be loaded. One such reaction has been hydrocracking. In hydrocracking, catalyst life is a serious consideration in the economics of the process. Thus, a catalyst having 60–70° F. more activity could lead to additional catalyst life of as much as 6 months. In addition, reactor size is an expensive item in the original unit design; thus, with a more active catalyst, the initial reactor size can be reduced giving a significant saving. In addition, the capacity of established units can be increased by the use of a more active catalyst.

SUMMARY OF THE INVENTION

It is, therefore, among one of the principal objectives of the invention to provide an improved hydrocracking catalyst composition characterized by high activity.

In accordance with the present invention, there has now been discovered an improved hydrocracking catalyst composition prepared by subjecting a crystalline aluminosilicate starting material, characterized by a silica/alumina mol ratio of at least 3, to up to about 35 percent alumina removal by treatment with a chelating agent, followed by contact of the resultant partially dealuminized crystalline aluminosilicate with a nonaqueous sulfur-containing solution of a platinum or palladium group metal, with the result that the metal is present in the catalyst composition, after drying, in the sulfided form.

Not only does the method of the invention produce a hydrocracking catalyst composition of improved activity, but there is also eliminated the necessity of a separate sulfiding step, as has been the custom of the prior art heretofore.

DESCRIPTION OF SPECIFIC EMBODIMENTS

The crystalline aluminosilicate employed as a starting material in the preparation of the subject catalyst composition is characterized by having a silica/alumina mol ratio of at least 3. One such material, illustrative thereof, is zeolite Y.

According to the invention, a zeolite Y-type starting material is treated with a suitable chelating agent, such as ethylenediamine tetracetic acid, hereinafter sometimes referred to as EDTA, to an extent such that between about 10 and 35 percent of the original alumina is removed therefrom. The resultant partially dealuminized material is then contacted with a platinum or palladium group metal salt dissolved in a nonaqueous sulfur-containing solvent. A suitable nonaqueous sulfur-containing solvent has been found to be dimethylsulfoxide hereinafter sometimes referred to as DMSO. The range of concentration of metal cation to solvent can be between about .001 g./ml. to about 0.1 g./ml.

It has been discovered to be a critical feature of the invention that between about 10 to 35% of the original alumina content be removed from the crystalline aluminosilicate starting material, and preferably between about 10 to 15%, since it has been found that the omission of the alumina chelation step will not produce a catalyst as effective in hydrocracking as the present one. This will be seen in the comparative data to be subsequently shown.

As mentioned, the partially dealuminized material is then contacted with a solution containing one or more salts of a platinum or palladium group metal present as the cationic form in a nonaqueous sulfur-containing solution, e.g., dimethylsulfoxide, which latter solvent has been found to have no adverse interactions with the crystalline aluminosilicate material. Finally, in the process of drying the impregnated composite, it appears that a part of the DMSO interacts with the Pd to bring about the formation of a palladium sulfide within the pores of the zeolite.

In contrast, use of a separate sulfiding step utilizing $H_2S$ or an aqueous sulfide solution tends to cause precipitation of the metal sulfide outside the crystalline zeolite particles.

Typical hydrocracking conditions for use of the improved catalyst consist of temperatures of 424–900° F. using molar hydrogen to hydrocarbon charge in the ratio of 2–80. The pressure employed will vary from 100 to 3500 p.s.i.g. and a liquid hourly space velocity between 0.1 to 10.

Typical charge stocks advantageously employed consist of heavy petroleum stocks, residue stocks, cycle stocks, and other hydrocrackable stocks.

The invention will be described further in conjunction with the following specific illustrative examples.

EXAMPLE 1

This catalyst was prepared by first synthesizing a high silica NaY by the method of Belgian Patent 598,582, reacting an alkali aluminate solution with a colloidal silica solution (Ludox).

2275 g. of the resulting sodium Y crystalline aluminosilicate was slurried with 442 g. EDTA in 4420 ml. $H_2O$ at 200° F. for 24 hours to reduce the alumina content and increase the silica-alumina ratio. Treatment was repeated. The EDTA treated NaY was then base exchanged continuously with a 10% $NH_4Cl$ solution at 180° F. over about a 10-day period using 320 lbs. of solution over 2.5 lbs. of aluminosilicate. After the base exchange, the aluminosilicate was washed essentially free of chloride ions and dried at 230° F. At this point, the exchanged treated $NH_4Y$ had a composition by analysis of 0.6 weight percent Na, 78.5 weight percent $SiO_2$, 18.1 weight percent $Al_2O_3$ ($SiO_2/Al_2O_3$ molar ratio of 7.37).

In preparing the Pd-containing catalyst, 298.1 g. of the above dried powder (75.5 weight percent solids at 1000° F.) was added to 500 ml. of a solution of 5.595 g. $Pd(NO_3)_2$ (2.276 g. Pd) in dry DMSO. This is equal of 1% Pd on final catalyst basis. This slurry of powdered $NH_4Y$ and DMSO was heated to 150° C. and held for 24 hours while being stirred. After this contact, the aluminosilicate was filtered out of the slurry, forming a wet cake which was washed twice with 350 ml. of dry DMSO, followed by drying at 230° F. for 18 hours.

The dry powder was pelleted, crushed and sized 14 to 25 mesh then calcined for 10 hours at 1000° F. in air.

The catalyst was found by analysis to contain 0.49 weight percent Pd. By X-ray analysis, it was 85% crystalline, compared to a standard acid Y reference and had a surface area of 596 m.$^2$/g.

Catalytic evaluation of this catalyst and of the following catalysts, at hydrocracking conditions, is summarized in Table I, below, immediately following Examples 1–6, and such catalytic evaluation will also serve as examples of the invention.

EXAMPLE 2

This example was prepared by a method quite similar to that discussed under Example 1. Here the original NaY aluminosilicate was a commercially available material and had the following starting composition: 10.3 wt. percent Na, 61.6 wt. percent $SiO_2$, 21.6 wt. percent $Al_2O_3$ and a $SiO_2/Al_2O_3$ molar ratio of 4.8.

In the EDTA contact, 9.54 lbs. of NaY wet cake (43.8 wt. percent solids at 1000° F.) was contacted twice with 537 g. EDTA in 3575 ml. water for 24 hours at 200° F. After each contact, the filter cake was washed with 4 liters of water.

The EDTA treated NaY was first base exchanged batchwise twice with a 25 wt. percent $NH_4Cl$ solution using 1 lb. $NH_4Cl$ per lb. of NaY. The contacts were for 24 hours at 200° F. Following this batchwise exchange, the NaY was then placed on continuous exchange with a 10 wt. percent $NH_4Cl$ solution at 180° F. for an eight-day period charging 240 lbs. of solution over the above NaY. This exchange was followed by water wash to remove the chloride ion, and then dried at 230° F. The dried material (87.3 wt. percent solids at 1000° F.) by analysis was found to contain 0.23% Na.

In preparing the Pd-containing catalyst, 57.2 g., the dry $NH_4Y$ powder (87.5% solids at 1000° F.) was slurried in 75 ml. of dry DMSO containing 7.84 g. $Pd(NO_3)_2$ (3.19 g. Pd), heated to 150° C. and held 24 hours at 150° C. while stirring. Then the slurry was filtered, dried at 230° F. for 17 hours, pelleted and sized 14 to 25 mesh, followed by calcination to 1000° F. at 2° F. per minute and held for 10 hours.

The final catalyst was found by analysis to contain 4.87 wt. percent Pd, 2.59 wt. percent S, and had a surface area of 488 m.$^2$/g. Thus, even after air calcination, the amount of sulfur (from DMSO) left in the catalyst corresponds to a completely sulfided form of all the Pd present in the catalyst ($PdS_2$).

EXAMPLE 3

This catalyst was prepared using the same dealuminized $NH_4Y$ used in preparing Example 2. It is essentially a repetition of Example 1.

In preparing the Pd-containing aluminosilicate, 114.5 g. of the dry powder was slurried with 220 ml. of dry DMSO containing 2.48 g. $Pd(NO_3)_2$ (1.01 g. Pd). It was heated to 150° C. and held there for 24 hours while stirring. The resulting slurry was filtered, washed twice at 132 ml. dry DMSO, and dried at 230°–500° F. for 22 hours. The dried powder was then pelleted and sized 14 to 25 mesh, calcined to 1000° F. for 10 hours.

By analysis, the final calcined catalyst was found to contain 0.84 weight percent Pd, 1.14 weight percent S, and had a surface area of 570 m.$^2$/g.

EXAMPLE 4 ($H_2O$ Impregnation)

In preparing this example, 56.7 g. (87.3 wt. percent solids) of a $NH_4Y$ prepared in a manner described under Examples 1 and 2, having a residual Na of 0.64 wt. percent and a $SiO_2/Al_2O_3$ with 110 ml. water instead of DMSO. The water solution contained 1.24 g. $Pd(NO_3)_2$ (0.505 g. Pd). Heating and stirring for 24 hours at 214° F. was also used here for good distribution of Pd. It was found necessary to add some (14 cc.) octal alcohol to reduce foaming. Fltered wet cake was washed twice with 65 ml. of water, dried 18 hours at 250° F., pelleted and sized 14 to 25 mesh, calcined 2° F./min. to 1000° F. and held for 10 hours at 1000° F.

In this case, the final catalyst was found to contain 0.73 weight percent Pd and had a surface area of 651 m.$^2$/g.

Even though this catalyst had a high surface area, it required a much higher temperature (535° F.) than the corresponding Pd/DMSO impregnated catalysts. This clearly indicates the relatively poor performance of catalysts prepared by aqueous Pd impregnation.

EXAMPLE 5 (Unchelated NaY Base)

This example was prepared as a reference to test the comparative performance of an unchelated Y aluminosilicate as a catalyst base. In other respects, the catalyst preparation is analagous to that used in Example 2.

Specifically, 5 lbs. of the NaY (43.8% solids) was first contacted (batchwise) three times with a 25% solution of $NH_4Cl$ at 200° C. This was followed by continuous exchange with 240 lbs. of a 10% solution of $NH_4Cl$ at 180° F. over a 4-day period. The product was $H_2O$ washed for 7 days at 180° F. until the effluent was essentially chloride-free. The resulting product was dried in air at 230° F. The residual sodium content at this point was 0.37 weight percent.

To 61.4 g. of the above-dried $NH_4Y$ aluminosilicate, was added 75 ml. of dry DMSO containing 7.84 g. $Pd(NO_3)_2$ (3.19 g. Pd) heated to 150° C. and held at 150° C. for 24 hours while slurrying. Following this contact, the slurry was filtered, wet cake dried at 230° F., pelleted and sized 14 to 25 mesh, and calcined at 1000° F. for 10 hours.

The final catalyst by analysis was found to contain 5.76 weight percent Pd and a 1.84 weight percent sulfur.

Catalytic evaluation as summarized in Table 1 show the high temperature requirement for this catalyst, indicating that both the use of chelated aluminosilicate, as well as impregnation using DMSO, are necessary in producing good, highly active catalysts.

The following catalyst preparation will serve to illustrate that DMSO could be used to pre-treat the chelated $NH_4Y$ prior to aqueous $Pd(NO_3)_2$ addition and still get good results.

EXAMPLE 6

In preparing this example, the chelated NaY and $NH_4Y$ were prepared in a manner described under Example 2 and had a residual sodium content of 0.23 weight percent. To 57.2 g. of this $NH_4Y$ was added 110 ml. dry DMSO at 150° C. and heated for 24 hours while stirring, filtered to recover the wet cake, washed twice with 65 ml. dry DMSO and finally dried at 230° F. for 23 hours.

The DMSO treated base was then contacted with a water solution of 1.24 g. $Pd(NO_3)_2$ in 110 ml. $H_2O$ for ½ hour at room temperature, dried under house (25 in Hg) vacuum in rotary dryer at 200° F., pelleted and sized 14 to 25 mesh, and then calcined for 10 hours at 1000° F.

By analysis, the final catalyst was found to contain 0.94 wt. percent Pd, 0.72 wt. percent S, and a surface area of 570 m.²/g.

Hydrocracking Beaumont H blend, whose properties are shown below, this catalyst was found to be quite comparable to the best and about 40° F., more active than the catalyst which was prepared using a water solution of $Pd(NO_3)_2$.

Properties of Beaumont H blend

Composition, wt. percent:
 Light coker _____ 20.4
 Heavy coker _____ 12.4

Composition, wt. percent:
 Light TCC and furfural extract _____ 19.3
Gravity, ° API _____ 19.0
Aniline number, ° F. _____ 131.4
Sulfur, p.p.m. _____ 1100
Nitrogen, p.p.m. _____ 710
Hydrogen, wt. percent _____ 10.69
Distillation VA (10):
 IBP _____ 388
 10 _____ 528
 30 _____ 614
 50 _____ 688
 70 _____ 735
 90 _____ 802
 EP _____ 832
Recovery, percent _____ 95

TABLE 1.—HYDROCRACKING OF BEAUMONT H BLEND, EFFECT OF CATALYST PREPARATION
[Pressure, p.s.i.: 1,500; LHSV (f./f. v./v. hr.: 0.60/0.4; $H_2$ Circ., s.c.f./B: 7,500]

| Catalyst of Example | 1 | 2 | 3 | 4 | 5 | 6 |
|---|---|---|---|---|---|---|
| Base: | | | | | | |
| Type | HY | HY | HY | HY | HY | HY |
| Chelation | Yes | Yes | Yes | Yes | | Yes |
| Other treatments | | | | | | DMSO |
| Hydrogenation component: | | | | | | |
| Type | Pd | Pd | Pd | Pd | Pd | Pd |
| Metal content, wt. percent | 1.0 | 4.87 | 0.84 | 0.73 | 5.76 | 0.94 |
| Medium | DMSO | DMSO | DMSO | $H_2O$ | DMSO | $H_2O$ |
| Sulfide content, wt. percent (finished catalyst) | | 2.59 | 1.14 | | 1.84 | 0.72 |
| Activity at 50 hrs., ° F | 479 | 485 | 494 | 535 | 513 | 496 |
| Product yield, wt. percent: | | | | | | |
| $C_1$-$C_3$ | 2.1 | 1.7 | 2.0 | 2.8 | 2.0 | 2.2 |
| $iC_4$ | 12.5 | 13.1 | 11.8 | 12.3 | 11.5 | 11.5 |
| $nC_4$ | 3.4 | 4.3 | 4.3 | 4.7 | 4.4 | 3.9 |
| $C_5$ | 12.0 | 15.8 | 16.3 | 11.8 | 13.2 | 13.5 |
| 125–180 | 5.1 | 3.2 | 4.3 | 3.6 | 4.5 | 3.2 |
| 180–290 | 35.2 | 31.8 | 37.7 | 34.5 | 33.4 | 37.1 |
| 290–390 | 32.7 | 33.2 | 26.7 | 29.5 | 35.1 | 31.6 |
| Total | 103.0 | 103.1 | 103.1 | 103.2 | 103.1 | 103.0 |
| On stream time, hrs | 42.5 | 137.5 | 22 | | 45.5 | 30.5 |

What is claimed is:

1. A method of preparing an improved hydrocracking catalyst composition which comprises subjecting a crystalline aluminosilicate starting material, characterized by a silica to alumina mol ratio of at least 3, to treatment with ethylenediamine tetraacetic acid chelating agent so that up to about 35 percent of the alumina is removed therefrom, then contacting the resultant partially dealuminized crystalline aluminosilicate with a nonaqueous dimethylsulfoxide solution of a compound of a metal selected from the group consisting of the platinum group metals and palladium group metals and drying the resulting metal contacted partially dealuminized crystalline aluminosilicate so that the metal is present in the dried catalyst composition in sulfided form.

2. The catalyst produced by the method of claim 1.

3. A method according to claim 1 wherein said crystalline aluminosilicate starting material is zeolite Y.

4. A process for hydrocracking hydrocarbons which comprises contacting a hydrocarbon charge stock under hydrocracking conditions comprising 425 to 900° F. using a molar ratio of $H_2$/hydrocarbon of 2–80, employing pressure of 100 to 3500 p.s.i.g. and a liquid hourly space velocity between 0.1 to 10, with the catalyst of claim 2.

References Cited

UNITED STATES PATENTS 2,964,480  12/1960  Schwartz _____ 252—439
3,321,521   5/1967  Kerr _____ 252—455X
3,418,256  12/1968  Rigney et al. _____ 252—455X DANIEL E. WYMAN, Primary Examiner C. F. DEES, Assistant Examiner U.S. Cl. X.R.

252—439, 455